Feb. 21, 1967 E. L. LEWIS ETAL 3,304,832
FILTER SWITCHING AND BIAS ADJUSTING MEANS
FOR USE IN A COLORIMETER
Filed April 19, 1963

INVENTORS:
EDWARD L. LEWIS
VARTAN VARTANIAN
BY
Brumbaugh, Free, Graves &
Donohue
THEIR ATTORNEYS 3,304,832
FILTER SWITCHING AND BIAS ADJUSTING
MEANS FOR USE IN A COLORIMETER
Edward L. Lewis, Sharon, Mass., and Vartan Vartanian, Rumford, R.I., assignors to Kollmorgen Corporation, Northampton, Mass., a corporation of New York
Filed Apr. 19, 1963, Ser. No. 274,242
2 Claims. (Cl. 88—14)

This invention relates to switching devices, and, more particularly to a switching device for adjusting a resistance in an electrical circuit simultaneously with a mechanically actuated alteration in apparatus associated therewith or in another element of the circuit.

It is often desirable or necessary to couple an alteration in a mechanical apparatus to a change in resistance in an electrical circuit. One example of such coexisting change occurs in apparatus used in the control of color matching in plastics, fabrics, paints, dyes and the like to make color difference between like products indistinguishable to the human eye. A number of types of color measuring devices are used, many of which employ several interference or optical color filters in sequence. For example, optical color filters are used in direct color comparison methods in which the content and intensity of the primary colors (amber, green and blue) in a sample and in a standard are compared. In other methods interference filters which pass only light within predetermined narrow band wave lengths, are used for spectrophotometric measurements of a sample against a white reference standard to determine the spectra curve of an unknown color or for detection of critical narrow band differentials between two samples.

The sensitivity and accuracy of results in color measuring devices employing filters greatly depends upon the light transmitting qualities of the filter. Generally, the filters have duller and clearer spots or areas which cause variations in the amount of light transmitted through the filter. These defects introduce errors into the electrical measurements being taken. While the error could be substantially eliminated by using absolutely uniform filters, they are very costly and difficult to obtain. It has been found that the inequalities of light transmission through filters can be compensated for by applying a biasing potential to the meter or oscilloscope on which the color measurement results are recorded. The error inherent in each of a plurality of filters may be corrected by employing apparatus according to the present invention to alter the biasing potential by changing a resistance element in the biasing circuit simultaneously with the change to a new filter.

In accordance with the invention, apparatus is provided for altering the electrical resistance in a circuit by changing the setting of a potentiometer to a predetermined position simultaneously and in accordance with some other mechanically actuated alteration.

More particularly, in accordance with the invention, a wheel or knob is mounted for axial movement on one end of a shaft which may be coupled to mechanical apparatus, such as, for example, a wheel carrying a plurality of filters in color measuring equipment, or to other adjustable means such as a multiple position electrical switch. The knob is provided with adjustable contacting means, for example, a series of adjusting screws, each of which is sequentially engageable with the shaft of a spring return potentiometer upon rotation of the knob. Each adjusting screw is positioned to coordinate its engagement with the potentiometer to a corresponding indexed position of the associated mechanical apparatus. To change from one indexed position to another, the adjustable knob is pulled back to disengage the adjusting screw from the potentiometer, turned to the desired position and returned to engage the adjusting screw corresponding to the new mechanical setting. Means may be provided to prevent turning the knob when one of the adjusting screws is engaged on the potentiometer to avoid damaging or destroying it. Additionally, the switch may be arranged to be operated automatically, as for example, by employing two position electrical solenoids to engage and disengage and to rotate it in response to a timer.

The primary advantage of the new switch is that it enables very sensitive and accurate adjustments in electrical circuits without the expense of procuring and installing a multiplicity of ordinary potentiometers or variable resistors. Its specific application in high quality color measuring equipment makes possible the use of less costly filters. Since the change in resistance is initiated mechanically rather than electrically as with the use of a number of potentiometers sequentially switched into and out of the ciruit, no error due to varying losses across the switch contacts is possible. Since the switching device may be arranged to operate automatically, it is well suited for use in production line monitoring systems in which measurements are made and recorded automatically.

For a better understanding of an exemplary embodiment of the invention described in detail hereinafter, reference may be made to the figures of the accompanying drawings, in which:

FIGURE 1 is a top view in section of a switching device according to the invention employed to manually rotate a filter wheel in color measuring apparatus and simultaneously adjust a biasing potential to recording meter or the like;

For purposes of description, an exemplary switching device is set forth in the context of electrically biasing a meter to compensate for optical shifts in a color measurement device resulting from defects in the filters. Nevertheless, as indicated previously, it will be understood that the device is readily adaptable to changing electrical resistance in any circuit in accordance with a corresponding mechanically actuated alteration in another element of the circuit or in mechanical apparatus associated therewith.

Figure 1:
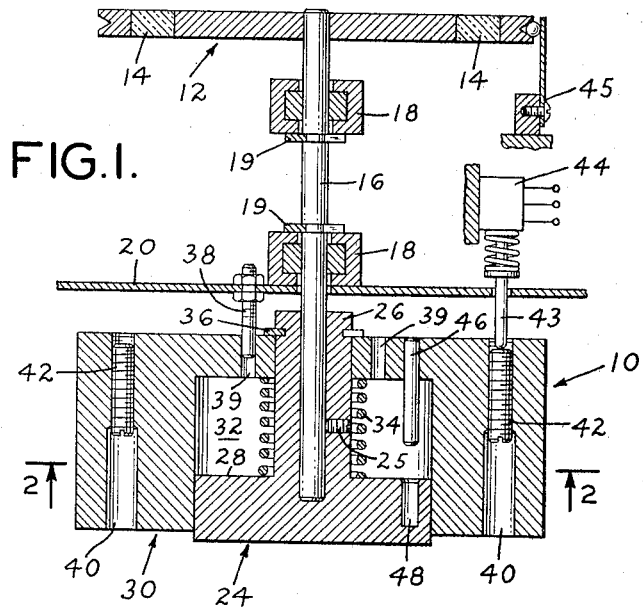
Figure 2:
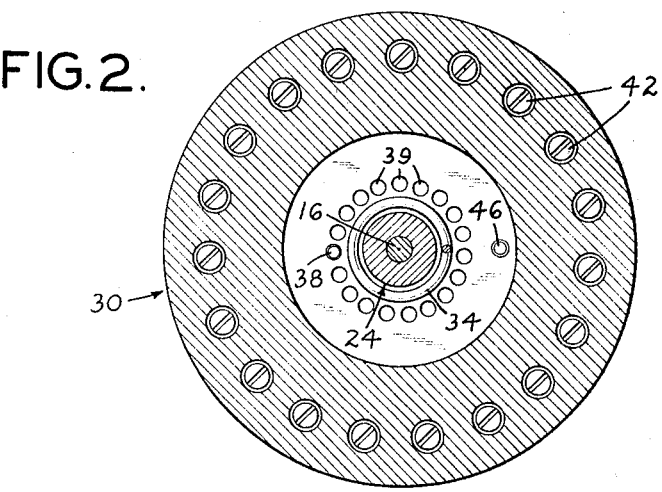
FIGURE 2 is a view in section taken along line 2—2 of FIGURE 1, looking in the direction of the arrows.

Referring to FIGURE 1, a switching device 10, in accordance with the invention, is coupled to a filter wheel 12, carrying a number of concentrically located filters 14, by a shaft 16 which is journaled in bearings 18 and restrained from axial movement by retaining rings 19. The end of the shaft 16 opposite the filter wheel 12 projects through an opening in a panel 20 and carries a hub 24 firmly secured thereto such as by a set screw 25. A knob 30, received on the hub 24, has a recess 32 within the flange portion 28 of the hub 24 to enable it to be pulled back axially. Spring means such as spring 34 located between the flange 28 of the hub 24 and the bottom of the recess 32 urges the knob 30 against a snap ring 36 mounted in a slot near the end of the neck portion 26 of the hub 24.

Attached to the panel 20 is a pin 38 which is slidable into and out of any one of a plurality of concentrically located holes 39 in the back of the knob 30, thereby preventing the knob 30 from being rotated when the pin 38 is engaged in a hole 39. Near the perimeter of the knob 30 are a number of concentrically located holes 40, each of which is partially threaded to receive adjusting screws 42. The number and angular position of the holes 40 correspond to the number and position of the filters 14 mounted in the filter wheel 12. When the knob 30 is in its normal position, as illustrated in FIGURE 1, one of the adjusting screws 42 engages a slide or plunger 43 adjusting a linearly movable contact of a spring return potentiometer 44. The engagement of the knob 30 by the pin 38 prevents inadvertent rotation of the knob, thereby avoiding the danger of damaging or destroying the potentiometer.

To switch the filter wheel 12 to a new filter, the knob 30 is pulled back along the neck 26 of the hub 24, thereby engaging a pin 46, which projects into the recess 32, in a corresponding hole 48 in the flange 28 of the hub. At the same time the knob 30 is disengaged from the pin 38 and may be rotated to bring the desired filter into position. A ball and spring detent 45 cooperates with indentations around the perimeter of the filter wheel to facilitate locating it precisely. When the desired filter is brought into position, the knob 30 is released, thereby engaging the pin 38 in the appropriate hole. At the same time the proper adjusting screw 42 engages and adjusts the movable contact of the potentiometer 44. It is, of course, apparent that each adjusting screw 42 may be turned with a screw driver to position it for the proper setting of the potentiometer for each filter.

Figure 3:
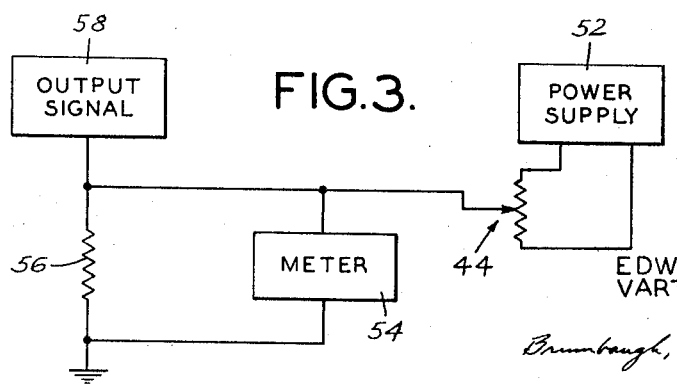
FIGURE 3 is a schematic diagram of an electrical circuit for biasing a meter in the color measuring apparatus.

Referring to FIGURE 3, the electrical potential from a power supply 52 is impressed across the potentiometer 44. An appropriate portion of the potential, in accordance with calibration and adjustment of each adjusting screw 42, is connected to one side of a meter 54. The meter 54 measures the voltage drop across a resistance 56 of an output signal 58 which will include the inherent error of the filters 14. The biasing potential adjusted by the potentiometer 44 compensates for the error, thereby enabling a reading on the voltmeter 54 which reflects the true characteristics being measured. It is clear, of course, that a similar biasing potential may be applied to other measuring devices such as an oscilloscope or an oscillograph, for example.

It will be understood by those skilled in the art, that the above described embodiment of the invention is susceptible of variation and modification, without departing from the spirit and scope of the invention, particularly with regard to the form of the knob, the arrangement for preventing damage to the potentiometer, and the means for causing change in the potentiometer setting. Further, the switching device may be readily adapted for automatic operation such as, for example, by employing a motor driven wheel with adjusting screws mounted therein and a solenoid or motor driven cam for producing in and out movement of the wheel. Additionally, the switching device disclosed herein has many other applications in addition to its use in color measuring devices. Therefore, the invention is not deemed to be limited except as defined in the appended claims.

I claim:

1. In a color measuring device including a plurality of selectable optical filters and electrical signal measuring means,
a filter switching device comprising a shaft with means coupled to said shaft for selectively positioning any one of said plurality of filters from a non-operating to an operating position,
an adjusting member mounted for axial movement relative to said shaft,
a plurality of adjusting screws mounted in said adjusting member,
a potentiometer having a projecting slide mounted for selective engagement by each of said adjusting screws,
a hub secured to said shaft,
spring means mounted between said hub and said adjusting member,
stop means mounted on said hub to limit axial movement of said adjusting member resulting from said spring means,
a fixed indexing pin,
a plurality of holes in said adjusting member for receiving said indexing pin selectively to prevent rotation of said adjusting member when the latter engages said stop,
a second pin mounted on said adjusting member for engaging a corresponding hole in said hub when said adjusting member is moved axially along said shaft away from said stop and out of engagement with the fixed indexing pin.

2. In a color measuring device including a plurality of selectable optical filters and signal measuring means,
a filter switching device comprising a shaft,
a rotatable member carrying a plurality of filters therein secured to one end of said shaft,
a hub secured to the other end of said shaft,
a rotatable position adjusting member mounted on said hub and axially movable relative to said hub,
spring means mounted between said hub and said adjusting member,
a snap ring on said hub to limit axial movement of said adjusting member,
a plurality of adjusting screws located in said adjusting member,
a potentiometer having a slide mounted for selective engagement by said screws, said potentiometer being electrically energized to supply a biasing signal to the signal measuring means,
and means for restraining said adjusting member against rotation when one of said adjusting screws is in contact with the potentiometer slide.

References Cited by the Examiner
UNITED STATES PATENTS

| | | | |
|---|---|---|---|
| 2,310,720 | 2/1943 | Wandrey | 192—142 |
| 2,345,927 | 4/1944 | Foster | 325—399 |
| 2,640,104 | 5/1953 | Owens | 325—397 |
| 2,774,276 | 12/1956 | Glasser et al. | 250—226 |

JEWELL H. PEDERSEN, *Primary Examiner.*

O. B. CHEW, *Assistant Examiner.*